US005723279A

United States Patent [19]

Jezequel

[11] Patent Number: 5,723,279

[45] Date of Patent: Mar. 3, 1998

[54] METHOD FOR PREPARING A PHOTOGRAPHIC EMULSION, AND APPARATUS FOR IMPLEMENTING THE METHOD

[75] Inventor: Pierre Henri Jezequel, Givry, France

[73] Assignee: Eastman Kodak Company, Rochester, N.Y.

[21] Appl. No.: 752,993

[22] Filed: Nov. 21, 1996

[30] Foreign Application Priority Data

Dec. 14, 1995 [FR] France .................................. 95 15008

[51] Int. Cl.[6] ........................... G03C 1/015; B01J 14/00

[52] U.S. Cl. ........................................ 430/569; 422/234

[58] Field of Search ............................ 430/569; 422/234

[56] References Cited

U.S. PATENT DOCUMENTS

| | | | |
|---|---|---|---|
| 3,415,650 | 12/1968 | Frame et al. | 430/642 |
| 3,482,982 | 12/1969 | Miyata | 430/569 |
| 3,650,757 | 3/1972 | Irie et al. | 430/569 |
| 3,655,166 | 4/1972 | Sauer et al. | 566/162.1 |
| 3,790,386 | 2/1974 | Posse et al. | 430/642 |
| 3,897,935 | 8/1975 | Forster et al. | 566/339 |
| 4,046,576 | 9/1977 | Terwilliger et al. | 430/569 |
| 4,147,551 | 4/1979 | Finnicum et al. | 430/567 |
| 4,171,224 | 10/1979 | Verhille et al. | 430/569 |
| 4,242,445 | 12/1980 | Saito | 430/569 |
| 4,251,627 | 2/1981 | Calamur | 430/569 |
| 4,758,505 | 7/1988 | Hoffmann | 430/569 |
| 5,104,786 | 4/1992 | Chronis et al. | 430/569 |

FOREIGN PATENT DOCUMENTS

| | | | |
|---|---|---|---|
| 0222252A2 | 10/1986 | European Pat. Off. | G03C 1/02 |
| 0523842A1 | 1/1993 | European Pat. Off. | G03C 1/015 |
| 2340082 | 3/1974 | Germany | G03C 1/02 |
| 1243356 | 8/1971 | United Kingdom | G03C 1/02 |
| 2022431 | 5/1979 | United Kingdom | G03C 1/05 |

*Primary Examiner*—Mark F. Huff
*Attorney, Agent, or Firm*—Arthur H. Rosenstein

[57] ABSTRACT

The invention concerns a method and a device for preparing a photographic emulsion.

The device according to the invention comprises a plurality of external circulation loops disposed in parallel and in which the content of a vessel containing at least a stirred gelatin solution is circulated, the loops having an identical configuration, means being provided for adding in an identical manner, to each of the loops, reagents required for the formation and/or growth of silver halide grains, the output of the circulation loops being recycled continuously in the vessel.

18 Claims, 4 Drawing Sheets

METHOD FOR PREPARING A PHOTOGRAPHIC EMULSION, AND APPARATUS FOR IMPLEMENTING THE METHOD

FIELD OF THE INVENTION

The invention concerns the field of the preparation of silver halide photographic emulsions, and concerns in particular changing laboratory-scale production to industrial-scale production.

BACKGROUND OF THE INVENTION

Typically, silver halide grains are produced by reacting an aqueous solution of a silver salt with an aqueous solution of a halide salt in a stirred solution of gelatin contained in a reactor.

To do this, and according to a first, so-called "single jet" technique, a solution of aqueous silver salt is added to an aqueous solution of gelatin and halide contained in a reactor stirred continuously. By way of example, U.S. Pat. No. 3,482,982 describes the introduction of halide ions either in crystalline form or in the form of a soluble salt during precipitation by a single silver bromoiodide jet.

According to another, so-called double jet technique, a silver salt solution (for example of silver nitrate) and a solution of at least one halide salt (for example potassium bromide, potassium iodide or potassium chloride) are added simultaneously and separately, at controlled flow rates, to a solution of gelatin stirred continuously by means of a stirrer whose speed typically varies between 1500 and 5000 rev/min. The temperature of the reactor depends on the characteristics of the emulsion and preferably varies between 40° and 75°. Examples of the preparation of emulsions using the double jet technique are described in U.S. Pat. Nos. 3,415,650; 3,650,757; 3,790,386; 3,897,935; 4,046,576 and 4,242,445; etc.

A technique substantially equivalent to the double jet technique is also described in French patent No 2,072,060, according to which a photographic emulsion is produced continuously by means of a pulsed reactor into which reagents necessary for the production of silver photographic grains are added separately.

According to yet another, more recent approach, a technique is used which employs an external circulation loop to recirculate the content of the evaporating vessel in which the emulsion is prepared. As shown in FIG. 1, a gelatin solution and at least one halide salt contained in a vessel 1 is stirred continuously by means of a stirrer 5 and pumped (pump 2) continuously at a controlled rate, to be channeled into a reactor 3 wherein a halide salt solution and a silver salt solution are added through a single entry point. The solution emerging from the reactor 3 is recycled in the vessel 1.

Such systems with an external reaction loop have been extensively described in the patent literature. Thus, for example, U.S. Pat. No. 5,104,786 entitled "Plug flow processes for the nucleation of Silver Halide Crystals" describes a system of this type, designed in such a way that the nuclei can pass through the reactor of the external loop only once.

Patent application EP-A-0 523 842, entitled "Apparatus for production of sparingly water-soluble salt crystal grains" describes a device in which the external loop is used for the continuous supply of ultra-free silver halide grains produced in a separate mixer so that there exists a slight supersaturation in the loop and in the main evaporating vessel so as to allow dissolution of these ultra-fine crystals by Ostwald's maturation in favor of the pre-existing crystals.

One of the problems with such an approach lies in the fact that the reagents added in the reaction loop are added by a single entry path (possibly by means of a mixer as suggested in the application EP-A-0 523 842). One of the problems associated with this approach with a single introduction point is related to the fact that local variations in the reaction conditions can occur, due to variations in the relative proportions in which the reagents combine, which can cause variations in the properties of the crystals produced, in particular the generation of undesirable morphologies.

U.S. Pat. No. 4,171,224 describes a system using a pre-mixing of reagents in a loop diverted from the main loop. Even though this approach helps to limit the effects of the problem mentioned above, it does not resolve it in a satisfactory manner.

Another problem which arises in the field of the preparation of emulsions lies in the passage from an experimental or developmental scale to an industrial scale. Typically, the process of preparing an emulsion involves intensive variables such as temperature, pAg and concentrations, which are independent of the scale of production, and extensive variables such as pumping rates and initial volumes which should vary linearly when there is a move from a first scale (laboratory type) to an industrial production scale. However, problems related to the sizing of precipitation equipment on several scales must also be taken into account, since this sizing cannot generally follow linear laws. This is the case in particular for the sizing of stirrers affording optimum dispersion of reagents in evaporating vessels, or injectors of reagents into loops. Consequently, the change from an emulsion preparation process in a 101 vessel to a 1001 vessel can necessitate long, costly adjustments, owing principally to their empirical nature. In other words, changing from a scale 1 to a scale 10, and then to a scale 100, does not routinely take place automatically and immediately simply by increasing the size of the evaporating vessel, the pumping rate and the size of the reactor by a factor of 10 or 100.

According to a first known approach, both the intensive variables (T°, PAg, Concentration) and the extensive variables of the precipitation formula are modulated. This technique has often proved insufficient owing to its awkward and uncertain nature.

According to another approach, the stirring in the vessel is acted on by modifying, for example, the diameter of the stirrer, the residence time in the external loop, the dilution ratio, etc. The drawback with this technique relates mainly to the difficulty associated with the changing of equipment for different precipitation formulae.

U.S. Pat. No. 4,147,551 suggests the use of a plurality of external circulation loops in parallel and mentions in particular the use of a first loop into which the silver salt would be introduced, and a second loop for the introduction of the halide salt. This approach, of the type with several different loops, does not contribute in any case to resolving the problem associated with the change of scale as described above.

Thus one of the objects of the present invention is to provide a method and a device for the preparation of a photographic emulsion which do not exhibit the drawbacks discussed above with reference to conventional techniques.

Another object is to provide a device and a method for producing a photographic emulsion and making it possible to change from one production scale to another without the need for adjustments to the formulations.

Other objects of the present invention will appear in detail in the following description.

These objects are achieved according to the invention by means of a device for the preparation of a silver halide photographic emulsion of the type with an external circulation loop, characterized in that it comprises a plurality of external circulation loops (101–10N) disposed in parallel and in which the content of a vessel (100) containing at least a stirred gelatin solution is circulated, the said loops having an identical configuration, means being provided for adding in an identical manner, to each of the loops, reagents required for the formation and/or growth of silver halide grains, the output of the circulation loops (101–10N) being recycled continuously in the vessel (100).

SUMMARY OF THE INVENTION

According to the invention, a device of the type with an external circulation loop is also produced to prepare a volume V of a silver halide photographic emulsion comprising:

a) a vessel with a volume at least equal to V, initially containing at least one stirred solution of gelatin;

b) pumping means for pumping the said solution continuously into the vessel, at a controlled rate $Q_p$;

c) N substantially identical external circulation loops, fed by the said pumping means and disposed in parallel so that each of the loops receives a flow of solution $Q_r=Q_p/N$, reagents required for the formation and/or growth of silver halide grains being added in an identical manner in each of the loops, at controlled flow rates $Q_{aj1}$, $Q_{aj2}$, the flow rates $Q_r$, respectively $Q_{aj1}$, $Q_{aj2}$ feeding each of the N loops being identical to the flow rates $Q_{ref}$, respectively $Q_{aj1ref}$, $Q_{aj2ref}$ of a reference device of the same type with a single circulation loop, substantially identical to the said N loops, for the production of a volume V/N of the same emulsion; and d) means for continuously recycling the output of each of the circulation loops in the vessel.

According to another aspect of the present invention, a method is produced for preparing a silver halide photographic emulsion, characterized in that the content of a vessel (100) containing at least a stirred solution of gelatin is circulated in a plurality of external circulation loops (101–10N) of identical configuration, disposed in parallel and in which reagents required for the formation and/or growth of silver halide grains are added in an identical manner for each of the loops, the output of the circulation loops (101–10N) being recycled continuously in the evaporating vessel (100).

According to a further aspect, a method is produced for preparing a volume V of a silver halide photographic emulsion comprising the following steps:

a) continuously pumping, at a given rate $Q_p$, the content of a vessel with a volume at least equal to V, initially containing at least a stirred solution of gelatin;

b) circulating the solution in N substantially identical external circulation loops, fed by the pumping means and disposed in parallel so that each of the loops receives a flow of solution $Q_r=Q_p/N$;

c) adding, in an identical manner to each of the loops, reagents required for the formation and/or growth of silver halide grains, at controlled flow rates $Q_{aj1}$, $Q_{aj2}$, the flow rates $Q_r$, respectively $Q_{aj1}$, $Q_{aj2}$ feeding each of the N loops, being identical to the flow rates $Q_{ref}$, respectively $Q_{aj1ref}$, $Q_{aj2ref}$ of a reference device of the same type with a single circulation loop substantially identical to the said N loops, for producing a volume V/N of the same emulsion; and d) continuously recycling the output of each of the circulation loops back into the vessel.

Advantageously, a first solution of a silver salt ($Ag^+$) and a second solution of a first halide salt $X_1^-$ are added to each of the circulation loops, the points of introduction of the said first and second solutions being offset in the direction of flow in the circulation loops, the solution of $Ag^+$ being introduced at a point situated upstream of the point of introduction of the solution of $X_1^-$.

BRIEF DESCRIPTION OF THE DRAWINGS

In the detailed description that follows, reference will be made to the drawing, in which.

DETAILED DESCRIPTION OF THE INVENTION

Contrary to the approaches described above, according to which the change of scale (1 to N) was produced by multiplying the volume of the vessel, the pumping rate and the volume of the reactor by N, the method and device according to the invention resolve the problem of changing scale by using N external circulation loops as configured on scale 1 and disposed in parallel so that, by having a pumping rate in the evaporating vessel which is N times greater than the pumping rate used on scale 1, each of the N loops has flow rate and volume conditions identical to those determined on scale 1 with a single loop.

Figure 1:
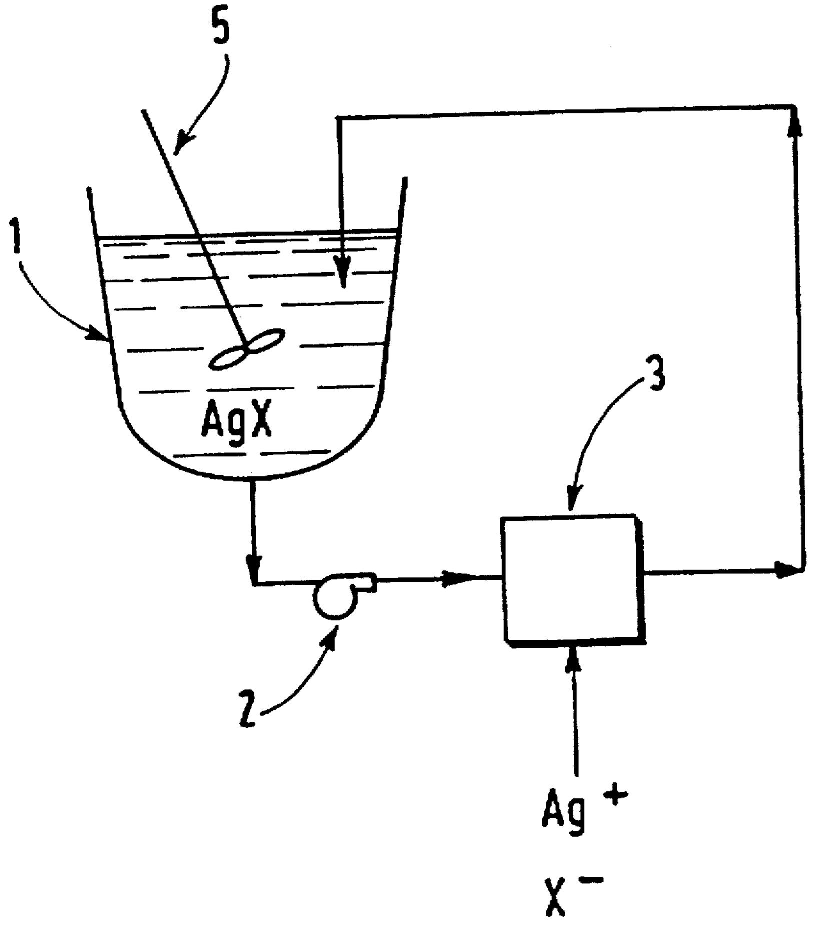
FIG.1 PRIOR ART
FIG. 1 depicts a device with an external circulation loop, known in the prior art.
Figure 2A:
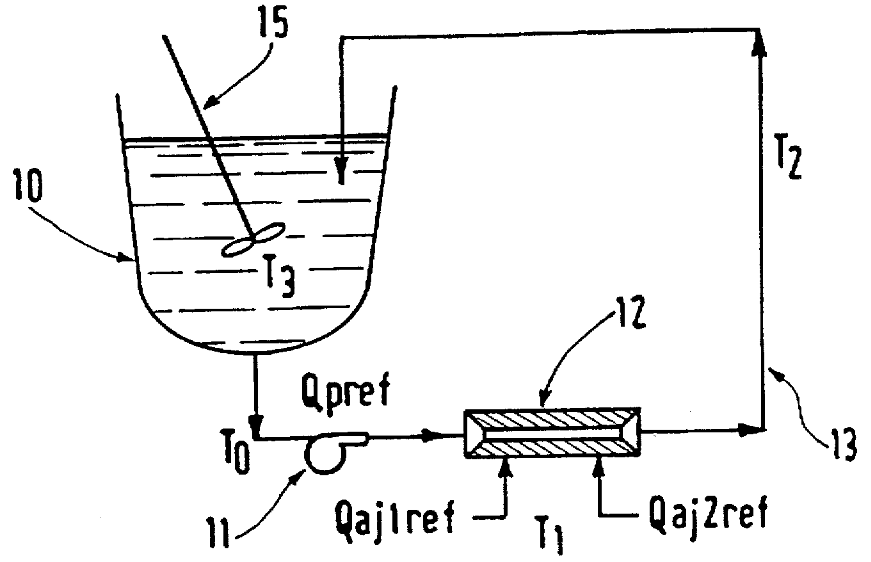
FIGS. 2A–2B depict diagrammatically an embodiment of the device according to the invention for changing from scale 1 to scale N.
Figure 2B:
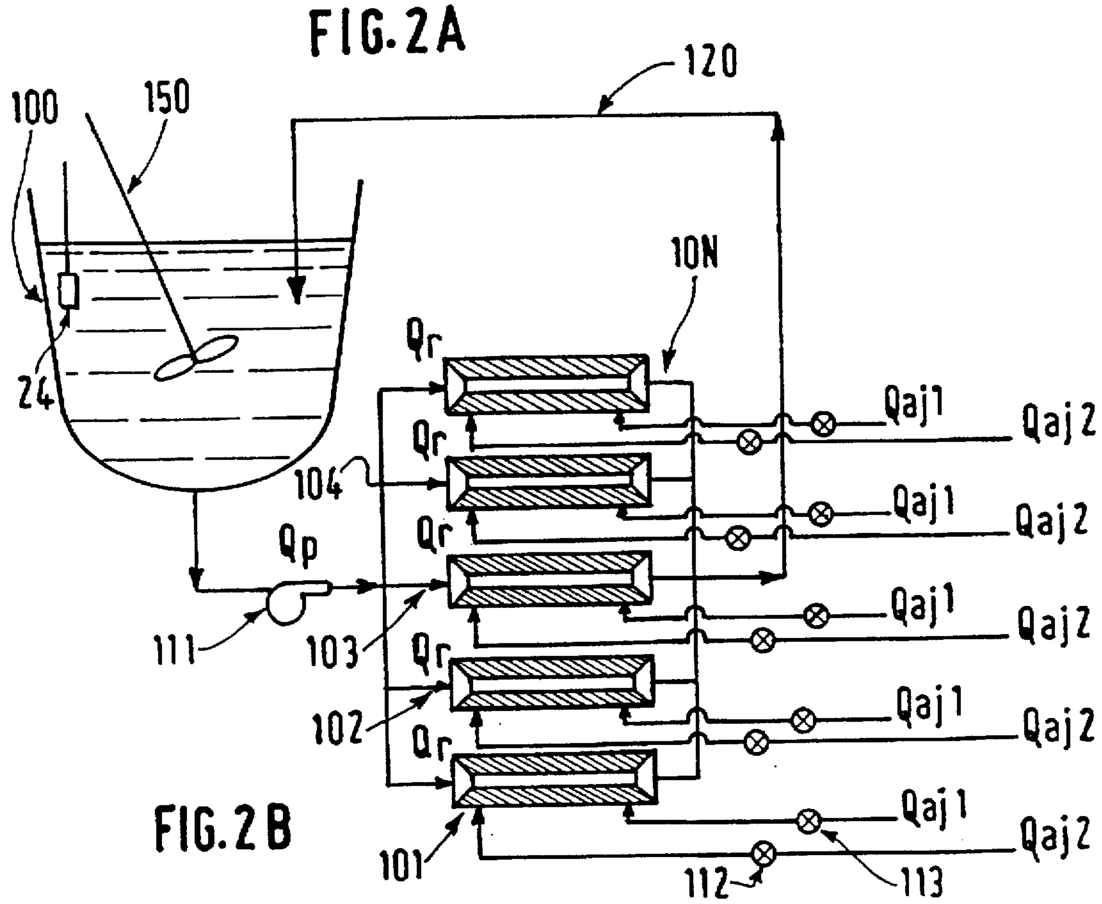

FIGS. 2A–2B illustrate diagrammatically the concept according to the invention. As illustrated in FIG. 2A, in a first step, the photographic emulsion is produced on a reference scale (in the laboratory, scale 1). To this end, a stirred gelatin solution (and, optionally, a halide salt) contained in a vessel 10 of volume $V_{ref}$ (at least equal to the volume of emulsion to be produced) is pumped 11 at a controlled rate $Q_p=Q_{pref}$ and sent into an external circulation loop 13 which has a reactor 12 before being recycled continuously in the vessel 10. The stirring in the vessel depends notably on the volume of the vessel and the type of stirrer used. In practice, the stirring must be sufficient for a majority of grains sent into the vessel from the external circulation loop not to return directly into the circulation loop. By way of example, with a "marine" type propeller, the speed of stirring with a 601 vessel is around 300 to 500 rev/mill. Within the meaning of the present application, the term "reactor" does not necessarily designate an individualized element of the circulation loop, but designates the portion of loop situated downstream of the point of introduction of the first reagent with respect to the direction of flow and in which, at least in part, the formation and/or growth reaction of the grains takes place.

To the reactor 12, a solution of silver salt (silver nitrate) is added at a flow rate of $Q_{aj1ref}$, and optionally a solution of at least one halide salt (potassium bromide, sodium bromide, potassium chloride, sodium chloride, potassium iodide or sodium iodide, etc) at controlled rates $Q_{aj2ref}$ allowing the formation and growth of silver halide photographic grains. These grain formation and growth mechanisms have been the subject of numerous publications, notably in the parent literature, and consequently require no additional description.

As will be seen in greater detail hereinafter, the configuration of the external circulation loop 13, notably as regards the points of introduction of the reagents, depends to a large degree on the emulsion to be produced. By way of example, it will be seen that it is possible to use one or more halide salts, and that these can be introduced wholly or partially, either directly into the evaporating vessel 10 or into the reactor 12, or into both, or even into the loop, upstream of the reactor 12. The same is true for the conditions of introduction of the silver salt. However, it is desirable, notably when the grains are growing, that there should be no pre-mixing of the halide salts and silver salt before their introduction into the reactor, since new fine grains of AgX could be formed. Owing to the low solubility of silver halides, the reaction is rapid, and preferably takes place in the reactor and, also preferably, in the circulation loop 13, according to the mixing characteristics of the main flow, these depending to a large extent on the circulation rate and the design of the reactor. The emulsion is then recycled into the main vessel 10.

According to a possible embodiment, the reactor 12 takes the form of a cylindrical (generated by rotation, for example) tubular element, open at both ends, one for receiving the solution pumped into the evaporating vessel 10, the other for the output of the solution after the addition, according to a first embodiment, of a silver salt solution and a halide salt solution, two inlets being formed in the wall of the tube and offset in the direction of flow, the inlet for the silver salt solution being upstream of that for the halide solution. A reference loop of this type is depicted diagrammatically in FIG. 3A.

Figure 3A:
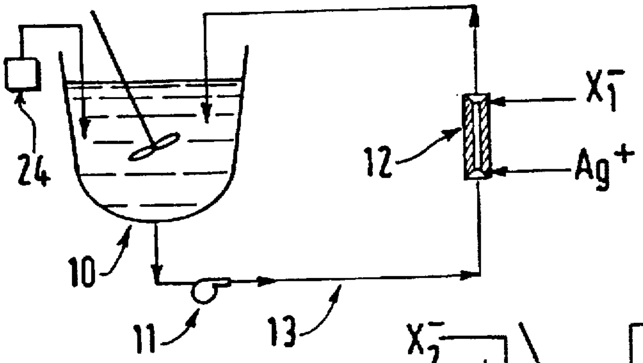
FIGS. 3A–3E illustrate diagrammatically various possibilities for the introduction of reagents in the device according to the invention.

By way of example, using circulation loops of the type depicted in FIG. 3A, with a solution whose kinematic viscosity is around $10^{-6}$ $m^2/s$, the pumping rate $Q_{pref}$ is preferably between 8 and 20 l/min. The associated Reynolds number will preferably be between 15,000 and 50,000, which gives the flow a very turbulent character. The Reynolds number can, however, be as low as 5000. As regards the residence times for the solution in the various portions of the loop, four residence times are to be taken into account, corresponding to the four portions of the loop: the time $T_0$ corresponding to the residence time between the vessel and the point of introduction of the silver salt; the time $T_1$ corresponding to the portion of the loop between the point of introduction of the silver salt and the point of introduction of the halide salt; $T_2$ corresponding to the time between the point of introduction of the halide salt and the vessel; and $T_3$, the average residence time in the vessel as defined hereinafter.

$T_3$ can be measured in different ways. By way of example, the following method is used: a ball (for example made of plastic) with zero floatability (with a tolerance of plus or minus 2 cm/s) is introduced into the vessel; at a fixed point in the external circulation loop (for example at the inlet to the reactor), means are disposed for detecting the passage of the ball; the time elapsing between two successive passages of the ball in from of the detection means is measured; the times $T_0$, $T_1$ and $T_2$ being known, the residence time of the ball in the evaporating vessel is derived therefrom; a distribution curve is then traced for residence times (TS); a normed distribution is derived therefrom, from which the integral of the normed distribution (DI) is calculated; a curve is then traced which has the time TS as its X-axis and DS=1−DI as its Y-axis; thus a point with coordinates $TS_0$, $DS_0$ represents the probability that a ball has a residence time greater than $TS_0$ in the upper evaporating vessel; the curve obtained substantially forms a straight line with a negative slope, the residence time in the evaporating vessel $T_3$ being the slope of the straight line.

$T_3$ is not fixed during precipitation, since it increases with the increase in volume in the evaporating vessel. On the other hand, $T_3$ is fixed from one scale to another to within plus or minus 20%, and preferably to within plus or minus 10%. In other words, at a time t in a scale 1 precipitation, the average residence time $T_3$ is identical (to +/−20% or +/−10%) to $T_3$ in a scale N precipitation at the same time t. Consequently, the positioning of the points of introduction to and removal from the evaporating vessel is acted on by varying the distance separating them; similarly, it is possible to act on the residence time by using means of the deflector type positioned in the vessel so as to modify the time $T_3$. By way of example, $T_3$ can vary from 5 to 60 secs between the start and end of precipitation.

$T_0$ is not a critical parameter. It can vary even if the scale is changed. In reality, it represents the residence time of the emulsion in a state of quasi-equilibrium. Typically, $T_0$ is significantly less than $T_3$ (typically 0.5 s), and preferably less than or equal to 10% of $T_3$. Also preferably, $T_0$ is less than or equal to 1% of $T_3$.

$T_1$ is a critical parameter for many emulsions. Preferably, $T_1$ varies between 8 ms and 1000 ms. Also preferably, $T_1$ varies between 30 and 200 ms.

$T_2$ is also an important parameter, since it can condition the effects related to Ostwald's maturation. This time does, however, depend to a large extent on the emulsion that is to be produced. Typically, $T_2$ varies between 300 and 1500 ms.

Another important parameter during the preparation of a photographic emulsion is the molar ratio $R_1$, expressed by the equation:

$$R_1 = \frac{C_x^k - Qp}{CAgQAg}$$

in which:

CAg is the silver salt concentration;

Qp is the pumping rate in the vessel;

QAg is the feed rate of the $Ag^+$ salt solution;

$C^k_{x^-}$ is the halide concentration in the vessel.

This ratio expresses how the silver halide salt injected into the reactor is mixed with the salt pumped into the evaporating vessel. $R_1$ is related to the local pAg of the reaction zone and can vary greatly from one experiment to another, or even in the course of a single precipitation. The molar ratio $R_1$ is greater than 1, preferably strictly, and can be as high as 15, for example.

Figure 3B:
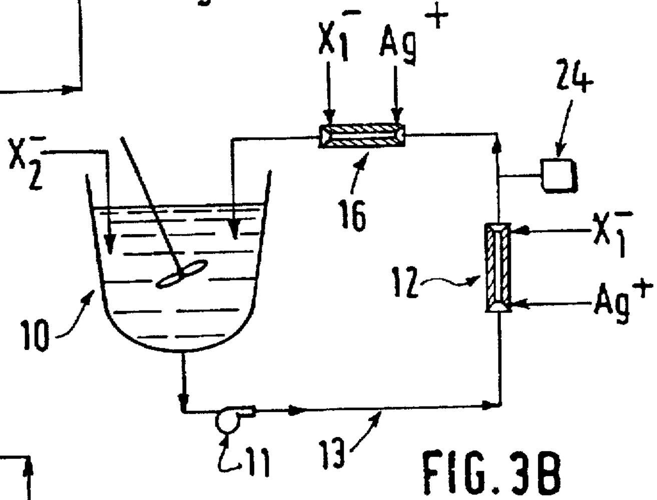

FIG. 3B depicts another embodiment of the reference loop. According to this approach, a silver salt solution $Ag^+$ and a solution of a first halide salt $X_1^-$ are introduced into the circulation loop 13 at the reactor 12, the point of introduction of the $X_1^-$ salt solution being offset in the direction of flow of the fluid with respect to the entry point of the $Ag^+$ salt. Furthermore, a second halide salt $X_2^-$ is introduced into the vessel 10. Such an approach affords the advantage of being able to modulate the pAg locally and notably facilitates the formation of certain photographic grain morphologies. The pAg is controlled by using a probe 24, placed either in the circulation loop (FIG. 3B), downstream of the reactor (or reactors), or directly in the vessel (FIG. 3A), the latter solution being preferred since the noise in measurement is lower. The result of the measurement of the pAg measurement probe (or probes) is used to control the rates of introduction of reagents.

Similarly, as illustrated in FIG. 3B, the circulation loop can comprise two or more reactors 12 and 16 disposed in series so that a silver salt solution, and optionally a halide salt solution, can be introduced into several portions of the external circulation loop, the effect of which will be to allow an increase in the rates of production of the emulsion, that is to say increasing the number of moles produced per unit of time. The reactors 12, 16 are disposed at the same points for all loops, so that the points of introduction of the reagents are situated at substantially the same points for each of the loops, which affords substantially identical residence times T0, T1, T2, T3 for each of the loops.

Figure 3C:
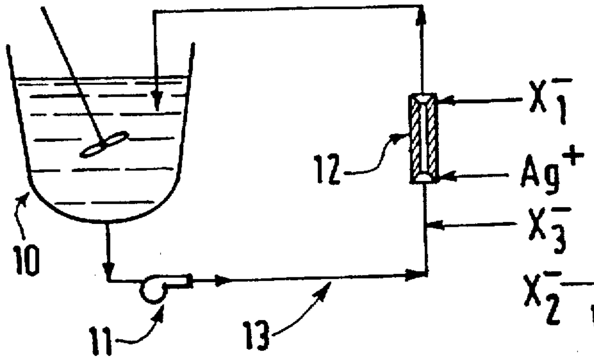

In the approach illustrated in FIG. 3C, a halide salt solution $X_3^-$ is introduced into the circulation loop 13 upstream of the point of introduction of the $Ag^+$ salt solution. This approach also enables the pAg to be increased or the dilution ratio to be increased locally before the reaction, which can, in certain cases, offer the advantage of generating flat photographic grains of lower thickness.

Figure 3D:
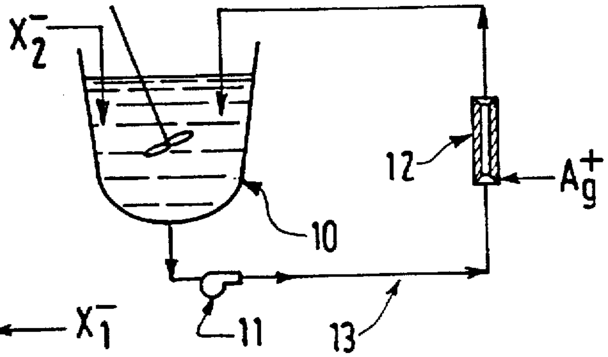

In the embodiment in FIG. 3D, the halide salt $X_2^-$ is introduced solely into the vessel, only the $Ag^+$ salt being introduced into the circulation loop 13, thereby enabling the reaction area to be isolated from the rest of the device and enabling the local environment of the crystals to be modified.

Figure 3E:
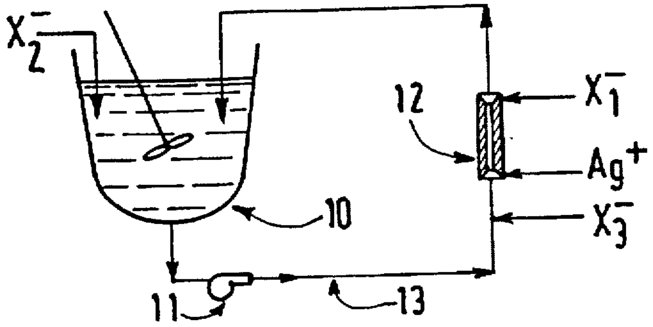

In the example illustrated in FIG. 3E, a first halide salt $X_3^-$ is introduced into the external circulation loop 13 upstream of the reactor 12, a silver salt solution is introduced at the inlet to the reactor 12, a second halide salt $X_1^-$ is introduced into the reactor downstream of the point of introduction of the silver salt, and a third halide salt $X_2^-$ is introduced into the vessel 10.

All these examples of configurations of reference loops are given solely by way of illustration. It is evident that, depending on the emulsion to be produced, other configurations can be envisaged.

Once these parameters for the production of photographic emulsion on the reference scale (scale 1) with a single loop have been determined, the change to the production scale (for the production of a volume V of emulsion equal to N times the volume prepared with the reference device) takes place, as illustrated in FIG. 2B, using a vessel 100 with a volume at least equal to V and disposing in the circulation loop N external circulation loops 101, 102, 103, 104, 10N, substantially identical to each other and substantially equal to the loop of the reference device used on scale 1 (notably with respect to the length of the loops, the reagents, the position of the points of introduction of the reagents), the rate of pumping $Q_p$ (pump 111) into the vessel 100 being N times greater than the rate of pumping $Q_{pref}$ into the reference vessel 10 so that each circulation loop 101, 102, 103, 104, 10N receives a flow $Q_r=Q_p/N$. Each of the circulation loops receives, by means of appropriate valves and pumps 112, 113, the same reagents as those added to the loop of the reference device, and at rates $Q_{aj1}$, $Q_{aj2}$, equal to the rates $Q_{aj1ref}$, $Q_{aj2ref}$ of introduction of the additions to the reference loop 13, so that the quantity of reagents supplied to the whole system overall is equal to N times the quantity of reagents supplied to the reference system. There is thus a change from scale 1 to 10, or to 100, simply by adapting the size of the vessel 100 to the volume V of emulsion to be produced, by multiplying the number of reference loops by 10 or 100 and multiplying the rate of pumping into the evaporating vessel by 10 or 100.

In a well-known manner, during or after the phases of nucleation, growth and ripening, anti-fogging agents, growth modifiers, gelatin solutions, dopants, anti-foaming agents, etc. are added to the photographic solution. All these elements are introduced either into the evaporating vessel or into the loop, with the exception of the dopants, which are introduced only into the external circulation loops, in which case, during a change of scale, they are introduced into each external circulation loop with a flow rate equal to the rate of introduction of the same dopants into a reference device with a single loop during the preparation of the same emulsion on scale 1. As an example of a dopant, iridium and selenium can be cited. Other dopants are listed in Research Disclosure, September, 1994, Number 365. For all other additions of elements to the vessel (anti-fogging agents, gelatin, growth modifiers), in the same manner as for the halide salt introduced directly into the vessel, the change of scale takes place by multiplying the rates by the scale factor.

As mentioned above, when the external circulation loops are of the type depicted in 3B, 3D or 3E, that is to say when a halide salt solution is introduced into the vessel, passing from scale 1 to N, the rate of arrival of the salt in the vessel is also multiplied by N.

According to a particular embodiment, upstream of the points of introduction of the reagents, there is disposed an ultrafiltration unit to continuously eliminate water and soluble salts, thereby enabling more dilute reagents to be used if necessary.

The invention that has just been described is particularly advantageous in that it permits a change from one production scale to another without the need for adjustments to the formulation of the photographic emulsion. Furthermore, it notably enables the reaction area to be isolated from the evaporating vessel; it further affords better control of the supersaturation; it also affords better control of the pAg, notably at low pAg; moreover, it enables a range of emulsions to be produced, simply by changing the type, number and entry point of reagents into the external circulation loop or loops.

EXAMPLES a) Precipitation in a 20 liter reactor on scale 1.

Into a vessel stirred (main reactor) by a marine propeller and containing 7.5 liters of distilled water at 40° C., 37.7 g of gelatin and 0.0112 moles of NaBr and 58.8 ml of a solution containing 34 g/l of 1,8-dihydroxy-3,6-dithiaoctane were added.

Solutions, respectively of $AgNO_3$ at 2.4762 moles/liter and a mixture of NaBr at 2.3878 moles/liter and KI at 0.0622 moles/liter were added over 3 minutes at respective rates of 102 ml/min and 103.6 ml/min, the flow rate of the solution of NaBr/KI being regulated continuously to keep the pAg of the solution in the evaporating vessel at 8.7. During the following three minutes, the same solutions were added at rates of 102 ml/min and 103 ml/min respectively, the flow rate of the halide salt solution being regulated continually so that the pAg of the solution in the evaporating vessel varies continuously between 8.7 and 7.8. A growth of the crystals through the addition of the two previous solutions at respective rates of 102 ml/min and 103.1 ml/min was effected for 30 min by regulating the flow rate of the solution of halide salts to keep the pAg at 7.8.

The configuration of the system used was that described in FIG. 2A. The fluid in the main reactor was recirculated in an external loop at a rate of 10 liters/min, held constant throughout the period of precipitation. The volume of the part of the external recirculation loop which precedes the points of introduction of the reagents was 596 ml. The reagents were introduced simultaneously into this loop, the $AgNO_3$ solution first followed by the halide salts, the order being relative to the direction of flow of the fluid in the loop. The reagents were introduced through 2 injectors of 2 mm diameter, inclined at 45° to the direction of flow, the end of the injectors opening out substantially in the middle of the pipe constituting the external loop. The distance between the injectors for the two reagents was 10 cm. Over a portion equal to 10 cm upstream of the point of introduction of the $AgNO_3$ solution up to 20 cm after the point of introduction of the halide salts, the diameter of the pipework was held constant at 12 mm.

The volume of the part of the external recirculation loop situated between the point of introduction of the halide salts and the main reactor was 281 ml.

The removal of the fluid from the main reactor and delivery of the fluid to this reactor after passage in the loop were effected using tubes with an internal diameter of 14 mm. The delivery tube had, approximately 12 mm from its end, a plate the same size as the external diameter of the tube. The two tubes were positioned symmetrically with respect to the centre of the main reactor, at 15 cm from each other, and immersed 3 cm below the free surface of the liquid, measured before the start of the precipitation. The reactor was continuously stirred at 500 rev/min. The average residence time measured in the main reactor is 16.5 sec (+/−20%).

b) Precipitation in an 80 liter reactor on scale 4.

Into a stirred vessel coming 30 liters of distilled water at 40° C., 105.8 g of gelatin and 0.0448 moles of NaBr and 235.2 ml of a solution containing 34 g/l of 1,8-dihydroxy-3,6-dithiaoctane were added. Solutions respectively of $AgNO_3$ at 2.4762 moles/liter and a mixture of NaBr at 2.3878 moles/liter and KI at 0.0622 moles/liter were added over 3 minutes at respective rates of 408 ml/min and 414.4 ml/min, the flow rate of the solution of NaBr and KI being regulated continuously to keep the pAg of the solution in the evaporating vessel at 8.7. During the following three minutes, the same solutions were added at rates of 408 ml/min and 414.4 ml/min respectively, the flow rate of the halide salt solution being regulated continually so that the pAg of the solution in the evaporating vessel varies continuously between 8.7 and 7.8. A growth at respective rates of 408 ml/min and 412.4 ml/min was effected for the previous two solutions for 30 min by regulating the flow rate of the solution of halide salts to keep the pAg at 7.8.

The configuration of the system used was that described in FIG. 2B (using only four reactors). The fluid in the main reactor was recirculated in an external loop at a flow rate of 40 liters/min, held constant throughout the period of precipitation. The volume of the part of the external recirculation loop which precedes the points of introduction of the reagents was 2340 ml. Upstream of the points of introduction of the reagents, the flow of the liquid circulating in the external loop was divided by means of separators into four equal parts, each corresponding to a flow rate of 10 l/min. The reagents were introduced simultaneously and in an identical manner into these four parts of the loop, first the $AgNO_3$ solution and then the halide salts, the order being relative to the direction of flow of the fluid into the loop.

The reagents were introduced through injectors of 2 mm diameter, inclined at 45° to the direction of flow, the end of the injectors opening out in the middle of the pipe constituting the external loop. For each of the four branches, the distance between the injectors for the two reagents was 10 cm.

After the division of the flows, and over a portion going from 10 cm upstream of the point of introduction of the $AgNO_3$ solution up to 20 cm downstream of the point of introduction of the halide salts, the diameter of each of the four pipes was held constant at 12 min. After the addition of the reagents, the flows remain individualized over a portion corresponding to 60% of the volume of the recirculation loop situated between the points of introduction of the halide salts and the main reactor. The volume of the part of the external recirculation loop situated between the point of introduction of the halide salts and the main reactor was 1044 ml.

The removal of the fluid from the main reactor took place through the bottom of the main reactor. The delivery of the fluid into this reactor after passage in the loop took place by means of a tube with an internal diameter of 18 mm. The delivery tube had, 30 mm from its end, a plate the same size as the external diameter of the tube. It was positioned 5 cm above the wall of the main reactor, at an equal distance from the centre and edge of this reactor. The reactor was continuously stirred at 500 rev/min. The average residence time measured in the main reactor was 19 sec (+/−20%).

Figure 4:
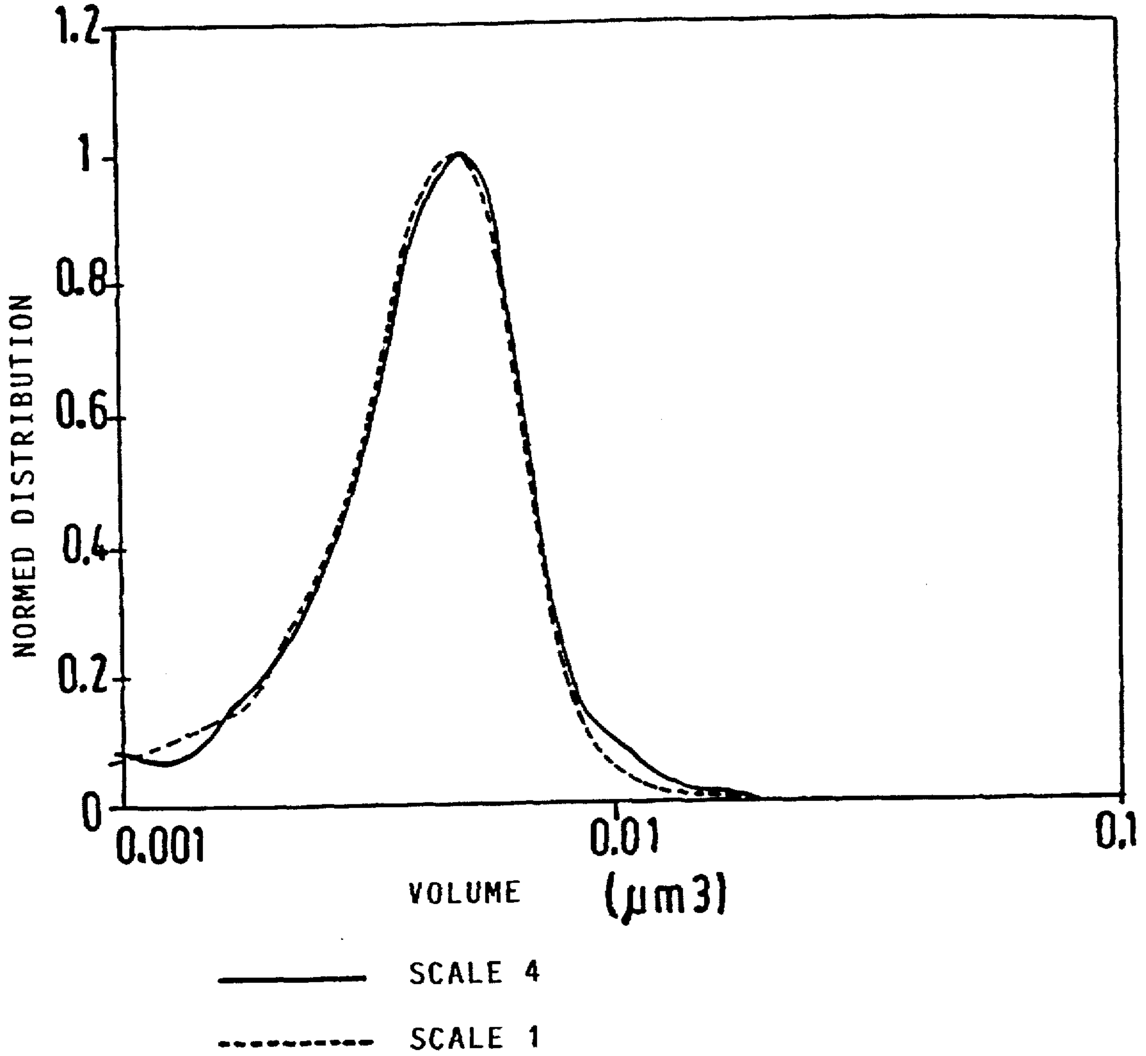
FIG. 4 is a graph illustrating a distribution of grain sizes from scale 1 to scale 4.

FIG. 4 is a graph depicting the grain size distribution in the scale 1 system (broken lines) and in the scale 4 system (continuous line) referred to the same volume. As is clearly seen, the grain size distribution is identical, thus demonstrating that the problem related to the change of scale is resolved perfectly by implementation of the present invention.

In the above description, reference was made to preferred embodiments of the invention. It is evident that variants can be made thereto without departing from the spirit of the invention as claimed hereinafter. By way of example, applications other than the preparation of photographic emulsions can be envisaged according to the present invention, such as the preparation of precipitates of barium sulphate.

I claim:

1. Method for preparing a silver halide photographic emulsion, wherein the content of a vessel containing at least a stirred solution of gelatin is circulated in a plurality of external circulation loops of identical configuration, disposed in parallel and in which reagents required for the formation and/or growth of silver halide grains are added in an identical manner for each of the loops, the output of the circulation loops being recycled continuously in the vessel.

2. Method for preparing a volume V of a silver halide photographic emulsion comprising the following steps:

a) continuously pumping, at a given rate $Q_p$, the content of a vessel with a volume at least equal to V, initially containing at least a stirred solution of gelatin;

b) circulating said solution in N substantially identical external circulation loops, fed by pumping means and disposed in parallel so that each of the loops receives a flow of solution $Q_r=Q_p/N$;

c) adding, in an identical manner to each of the loops, reagents required for the formation and/or growth of silver halide grains, at controlled flow rates $Q_{aj1}$, $Q_{aj2}$, the flow rates $Q_r$, $Q_{aj1}$, $Q_{aj2}$ feeding each of the N loops, being identical to respectively the flow rates $Q_{pref}$, $Q_{aj1ref}$, $Q_{aj2ref}$ of a reference device with a single circulation loop substantially identical to each of the N loops, for producing a volume V/N of the same emulsion; and d) continuously recycling the output of each of the circulation loops in the vessel.

3. Method according to claim 2, wherein a first solution of a silver salt and a second solution of a first halide salt are added to each of the circulation loops, the points of introduction of the first and second solutions being offset in the direction of flow in the circulation loops, the solution of the silver salt being introduced at a point situated upstream of the point of introduction of the solution of the first halide salt.

4. Method according to claim 3, wherein a solution of a second halide salt is added to the vessel at a controlled flow rate.

5. Method according to claim 4, wherein a solution of a third halide salt is added to each of the circulation loops, upstream of the point of introduction of the silver salt.

6. Method according to claim 2, wherein a silver salt solution is added to each of the circulation loops and a halide salt solution is added to the vessel.

7. Method according to claim 6, wherein, during the growth of photographic grains, the reagents are introduced in at least two portions of each of the external circulation loops.

8. Method according to claim 7, wherein at a time t average residence time in the vessel on scale 1, corresponding to a production of a volume V/N of emulsion by a device with a single loop, is substantially identical to within +/−20% to average residence time in the vessel on scale N, corresponding to a production of a volume V of the same emulsion by a device with N loops, at the same time t.

9. Method according to claim 8, wherein at a time t the average residence time in the vessel on scale 1 is substantially identical to within +/−10% to the average residence time in the vessel on scale N at the same time t.

10. Method according to claim 9, wherein solutions intended for the doping of the photographic emulsion are added into said external circulation loops.

11. Device for the preparation of a silver halide photographic emulsion with an external circulation loop system, wherein the loop system comprises a plurality of external circulation loops disposed in parallel and in which the content of a vessel containing at least a stirred gelatin solution is circulated, the loops having an identical configuration, means being provided for adding in an identical manner, to each of the loops, reagents required for the formation and/or growth of silver halide grains, the output of each of the circulation loops being recycled continuously in the vessel.

12. Device with an external circulation loop system for preparing a volume V of a silver halide photographic emulsion comprising:

a) a vessel with a volume at least equal to V, initially containing at least a stirred solution of gelatin;

b) pumping means for pumping the solution continuously into the vessel, at a controlled rate $Q_p$;

c) N substantially identical external circulation loops, fed by the pumping means and disposed in parallel so that each of the loops receives a flow of solution $Q_r=Q_p/N$, means being provided for adding in an identical manner, to each of the loops, reagents required for the formation and/or growth of silver halide grains at controlled flow rates $Q_{aj1}$, $Q_{aj2}$, the flow rates $Q_r$, $Q_{aj1}$, $Q_{aj2}$ feeding each of the N loops, being identical to respectively the flow rates $Q_{pref}$, $Q_{aj1ref}$, $Q_{aj2ref}$ of a reference device with a single circulation loop, substantially identical to each of the N loops, for the production of a volume V/N of the same emulsion; and d) means for continuously recycling the output of each of the circulation loops in the vessel.

13. Device according to claim 12, comprising means for introducing a first solution of a silver salt and a second solution of a first halide salt into each of the circulation loops, the points of introduction of said first and second solutions being offset in the direction of flow in the circulation loops, the solution of silver salt being introduced at a point situated upstream of the point of introduction of the solution of the first halide salt.

14. Device according to claim 13, wherein said points of introduction are offset by a distance such that the average residence time $T_1$ of the solution between the two points varies between 8 ms and 1000 ms.

15. Device according to claim 14, wherein said points of introduction are offset by a distance such that the average residence time $T_1$ of the solution between the two points varies between 30 ms and 200 ms.

16. Device according to claim 15, wherein each of the external circulation loops comprise at least two portions disposed in series, and at which said reagents are introduced during the growth of photographic grains.

17. Device according to claim 16, comprising also means for measuring the pAg disposed in said loops downstream of the area (or areas) of introduction of the reagents.

18. Device according to claim 16, comprising also means for measuring the pAg disposed in the vessel.

* * * * *